United States Patent
Hung et al.

(10) Patent No.: US 9,501,180 B2
(45) Date of Patent: Nov. 22, 2016

(54) CAPACITANCE SENSING APPARATUS AND CONTROL METHOD

(75) Inventors: Guo-Kiang Hung, Hsinchu (TW);
Hsuan-I Pan, Hsinchu (TW);
Ting-Hao Yeh, Hsinchu (TW);
Kai-Ting Ho, Hsinchu (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 472 days.

(21) Appl. No.: 13/344,996

(22) Filed: Jan. 6, 2012

(65) Prior Publication Data
US 2012/0299869 A1 Nov. 29, 2012

(30) Foreign Application Priority Data

May 26, 2011 (CN) .................................. 100118499

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ............... G01R 27/26; G01R 27/2605; G02F 1/13338; G06F 3/0412; G06F 3/044; G09G 2310/06; G09G 2310/061; G09G 3/3629; G09G 3/3648; H01L 27/14609; H01L 27/14643; H04N 5/3532; H04N 5/3575; H04N 5/3742
USPC .................... 345/156–184; 178/18.03–19.07, 178/18.01–20.04
See application file for complete search history.

(56) References Cited

U.S. PATENT DOCUMENTS

| | | | |
|---|---|---|---|
| RE33,120 E | * | 11/1989 | Nagae et al. .................... 349/37 |
| 2007/0001098 A1 | * | 1/2007 | Sano ........................... 250/208.1 |
| 2008/0048997 A1 | | 2/2008 | Gillespie et al. |
| 2008/0158176 A1 | * | 7/2008 | Land et al. .................... 345/173 |
| 2009/0085894 A1 | * | 4/2009 | Gandhi et al. ................. 345/175 |
| 2010/0110040 A1 | * | 5/2010 | Kim et al. ..................... 345/174 |

(Continued)

FOREIGN PATENT DOCUMENTS

TW M363639 8/2009

OTHER PUBLICATIONS

Taiwan Office Action, May 14, 2014, 7 pages.

*Primary Examiner* — Andrew Sasinowski
*Assistant Examiner* — Gerald Oliver
(74) *Attorney, Agent, or Firm* — Edell, Shapiro & Finnan, LLC (57) ABSTRACT

A capacitance sensing apparatus applied to a touch panel is provided. The capacitance sensing apparatus includes a plurality of sensor channels including a first sensor channel and a second sensor channel neighboring to each other. A first voltage signal is outputted to the first sensor channel. A plurality of capacitances of the first sensor channel are detected to generate a first capacitance result for touch sensing. A second voltage signal is outputted to the second sensor channel. A first voltage difference is present when the first voltage signal and the second voltage signal are respectively outputted to the first sensor channel and the second sensor channel, and a second voltage difference is present when the capacitance of the first sensor channel. The first voltage difference and the second voltage difference are substantially the same.

10 Claims, 5 Drawing Sheets

(56) References Cited

U.S. PATENT DOCUMENTS

2011/0057902 A1* 3/2011 Lee et al. ................... 345/174
2011/0187390 A1* 8/2011 Lin et al. ................... 324/679
2011/0261006 A1* 10/2011 Joharapurkar ........ G06F 3/0416
                                                               345/174
2011/0279409 A1* 11/2011 Salaverry ............. G06F 3/0416
                                                               345/174

* cited by examiner

CAPACITANCE SENSING APPARATUS AND CONTROL METHOD

FIELD OF THE INVENTION

The present invention relates to a control method for a touch panel and associated apparatus, and more particularly, to a control method for charging/discharging electrodes of a touch panel and associated apparatus.

BACKGROUND OF THE INVENTION

Accompanied with continuous technology breakthroughs, touch panels are prevailingly applied in various electronic devices from smart phones, digital cameras to tablet PCs. Popularization of touch panels not only eliminates the provision of keypads but also enlarges display screens of common electronic devices.

Figure 1:
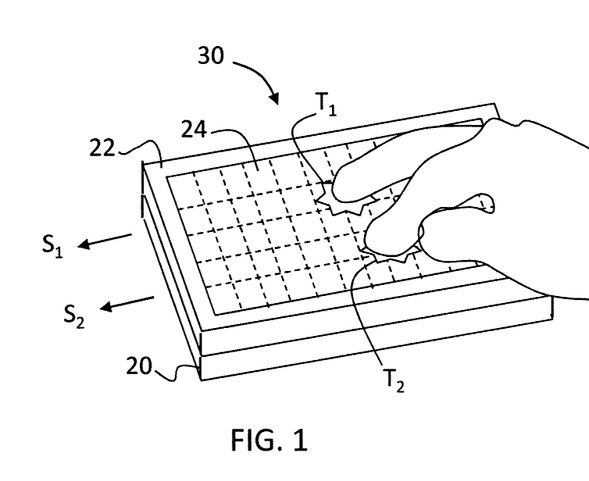
FIG. 1 is a perspective view of a monitor.

FIG. 1 shows a perspective view of a monitor 30, which comprises a transparent touch panel 22 disposed on a display panel 20. When the touch panel 22 detects a touch event that a surface 24 of the touch panel 22 is touched or approached by an object, the touch panel 22 sends out a corresponding signal to a processor (not shown) for subsequent corresponding operations. For example, as shown in FIG. 1, when a finger presses the monitor 30 at two touched points $T_1$ and $T_2$, the monitor generates corresponding tracking signals $S_1$ and $S_2$ carrying information such as coordinates and pressure corresponding to the touched points.

A touch panel adopting a projected capacitive touch (PCT) technology comprises numerous capacitance sensing nodes thereupon. Each of the capacitance sensing nodes comprises at least one electrode. A sensing principle of the PCT technology, for example, may be based on a variation of mutual capacitance or self capacitance, which is commonly referred to as a mutual touch sensing technique or a self touch sensing technique, respectively. For mutual touch sensing technique, a change in capacitance between two electrodes induced by a touch event is measured. In self touch sensing technique, a change in capacitive load of a single electrode induced by a touch event is measured. Furthermore, the measuring of each capacitance sensing point is independent from the measuring of other capacitance sensing points. Therefore, a relationship between capacitances and coordinates substantially reflects information such as a quantity, a center position and an area size of a touched point on the surface of the touch panel.

SUMMARY OF THE INVENTION

The present invention provides a control method for a touch panel comprising a plurality of sensor channels. A first voltage signal is outputted to a first sensor channel. A plurality of capacitances of the first sensor channel are sensed to generate a first capacitance result for touch sensing. A second voltage signal is outputted to a second sensor channel, which is neighboring to the first sensor channel. Between the first voltage signal and the second voltage signal is a first voltage difference when the first voltage signal and the second voltage signal are respectively outputted to the first sensor channel and the second sensor channel, and is a second voltage difference when the capacitance intensity of the first sensor channel is sensed. The first voltage difference and the second voltage difference are substantially the same.

The present invention further provides a capacitance sensing apparatus comprising a plurality of sensor channels, which comprise a first sensor channel and a second sensor channel. The capacitance sensing apparatus further comprises a plurality of capacitance sensors, which comprise a first capacitance sensor and a second capacitance sensor coupled to the corresponding sensor channels. When the first capacitance sensor is activated, the first capacitance sensor outputs a first voltage signal to the first sensor channel, and senses a plurality of capacitances of the first sensor channel to generate a first capacitance result for touch sensing. When the first capacitance sensor outputs the first voltage signal to the first capacitance sensor channel, the second capacitance sensor outputs a second voltage signal to the second sensor channel. The second sensor channel is neighboring to the first sensor channel. Between the first voltage signal and the second voltage signal is a first voltage difference when the first voltage signal and the second voltage signal are respectively outputted to the first sensor channel and the second sensor channel, and is a second voltage difference when the capacitance intensity of the first sensor channel is sensed. The first voltage difference and the second voltage difference are substantially the same.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

When a touch event takes places on a touch panel, mutual capacitances usually occur with self capacitances. During a touch sensing process, identification and positioning of a touched point can be enhanced supposing mutual influences of mutual capacitances and self capacitances are reduced.

In an embodiment below, the PCT technology is taken as an example for illustrating how an effect that mutual capacitances impose on the measuring of self capacitances can be reduced or eliminated.

Figure 2:
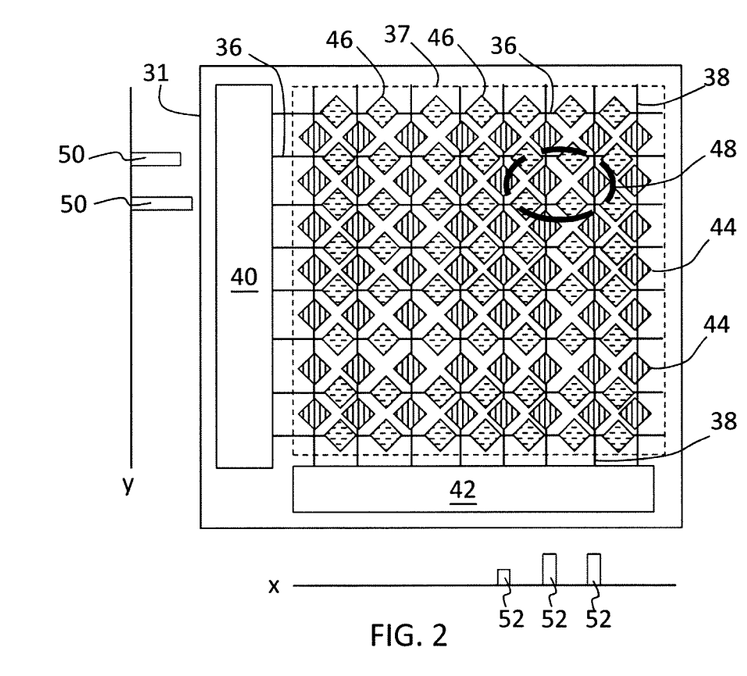
FIG. 2 is schematic diagram a touch panel applicable to the present invention.

FIG. 2 shows a touch panel 31 according to an embodiment of the present invention. A sensing region 37 comprises electrodes 44 and 46. In this embodiment, through a conductive trace, the electrodes 46 of a same row are shorted together to form a sensor channel 36, which is connected to a sensing apparatus 40. Similarly, through another conductive trace, the electrodes 44 of a same row are shorted to form a sensor channel 38, which is connected to a sensing apparatus 42. The sensing apparatus 40 is capable of sensing a self capacitance on each sensing channel 36, and the sensing apparatus 42 is capable of sensing a self capacitance of each sensor channel 38. For example, when a touched area 48 is generated by a finger touching the touch panel 31, the sensing apparatuses 40 and 42 respectively generate a y-axis self capacitance signal 50 and an x-axis self capacitance signal 52. When a processor receives the y-axis capacitance signal 50 and the x-axis self capacitance signal 52, a position of the touched area 48 can be obtained through appropriate operations.

Figure 3:
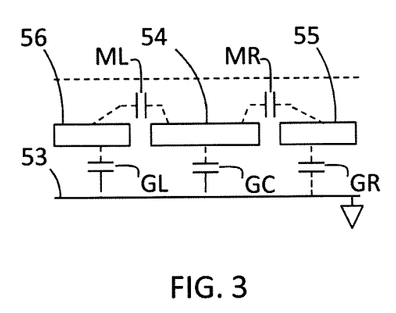
FIG. 3 and FIG. 4 respectively depict capacitances possibly formed when a touch panel is and is not touched by a finger.
Figure 4:
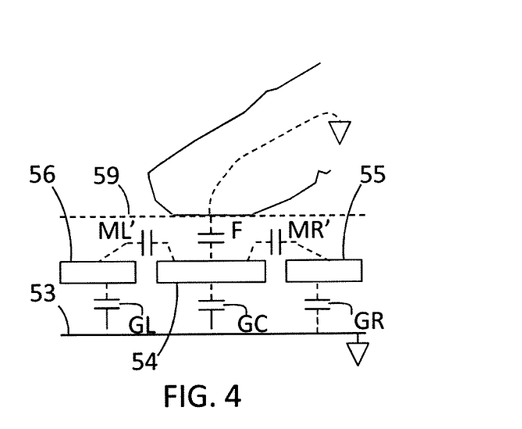

FIG. 3 and FIG. 4 respectively depict possible capacitances formed on a touch panel when the touch panel is not touched and is touched by a finger for illustrating changes in the capacitances due to the touch. In FIG. 3, conductors 54, 55 and 56 are transparent electrodes consisting of indium tin oxide (ITO) and are respectively connected to three sensor channels. For example, the conductor 53 is a grounded shielding layer. Mutual capacitors ML, MR, GL, GR and GC respectively show parasitic capacitances between every two conductors, with respective capacitances $C_{ML}$, $C_{MR}$, $C_{GL}$, $C_{GR}$ and $C_{GC}$. At this time, the self capacitance $C_{54B}$ of the conductor 54, which is the capacitance between the conductor 54 and a ground wire, can be deduced from an equation (1) below.

$$C_{54}B = C_{GC} + [(C_{ML}*C_{GL})/(C_{ML}+C_{GL})] + [(C_{MR}*C_{GR})/(C_{MR}+C_{GR})] \quad (1)$$

It is to be noted that, $C_{XX}$ represents the self capacitance of capacitor XX. In FIG. 4, due to a finger touching a surface 59 of a touch panel, a self capacitance F is formed between the finger and the conductor 54. Meanwhile, the mutual capacitors ML and MR are changed to different mutual capacitors ML' and MR' as a result of changes in an electronic field distribution. Similarly, the self capacitance $C_{54B}$ of the conductor 54 can be deduced from an equation (2) below.

$$C_{54A} = C_{GC}[(C_{ML'}*C_{GL})/(C_{ML'}+C_{GL})] + [(C_{MR'}*C_{GR})/(C_{MR'}+C_{GR})] + C_F \quad (2)$$

Therefore, it is observed from the equations (1) and (2) that, the measured "self capacitance" according to the above measuring method includes not only the capacitance of the self capacitor F and the mutual capacitor GL but also capacitance variations of the mutual capacitors ML and MR. This effect causes a non-linear relationship between the measured self capacitance of the conductor 54 and the capacitance of the self capacitor F.

When a sensing apparatus senses the self capacitance of a sensor channel, the sensing apparatus sends a voltage signal E(active) to the activated sensor channel, which is equivalent to send the voltage signal E(active) to the sensed electrodes, in order to measure a corresponding charge variation during charging/discharging for touch sensing. In an embodiment of the present invention, apart from the sensed sensor channel, the sensing apparatus also sends a voltage signal E(neighboring), substantially the same as the voltage signal E(active), to a sensor channel neighboring to the sensed sensor channel; however, the voltage signals E(neighboring) are not used for touch sensing. Accordingly, a voltage difference between the neighboring sensor channel and the sensed sensor channel is constantly maintained at 0, such that electric charges are not moved between the mutual capacitors of the sensed sensor channel and the neighboring sensor channel and thus no mutual capacitance is measured. Hence, the measured self capacitance may have a linear or nearly linear relationship with the self capacitance generated by an external object, e.g., a finger.

It is to be noted that, a neighboring sensor channel is a sensor channel between at least a part of which and the sensed sensor channel exists no conductor having a constant voltage, or is a sensor channel between which and a sensed sensor channel exists a mutual capacitance that does not need to be sensed.

Figure 5:
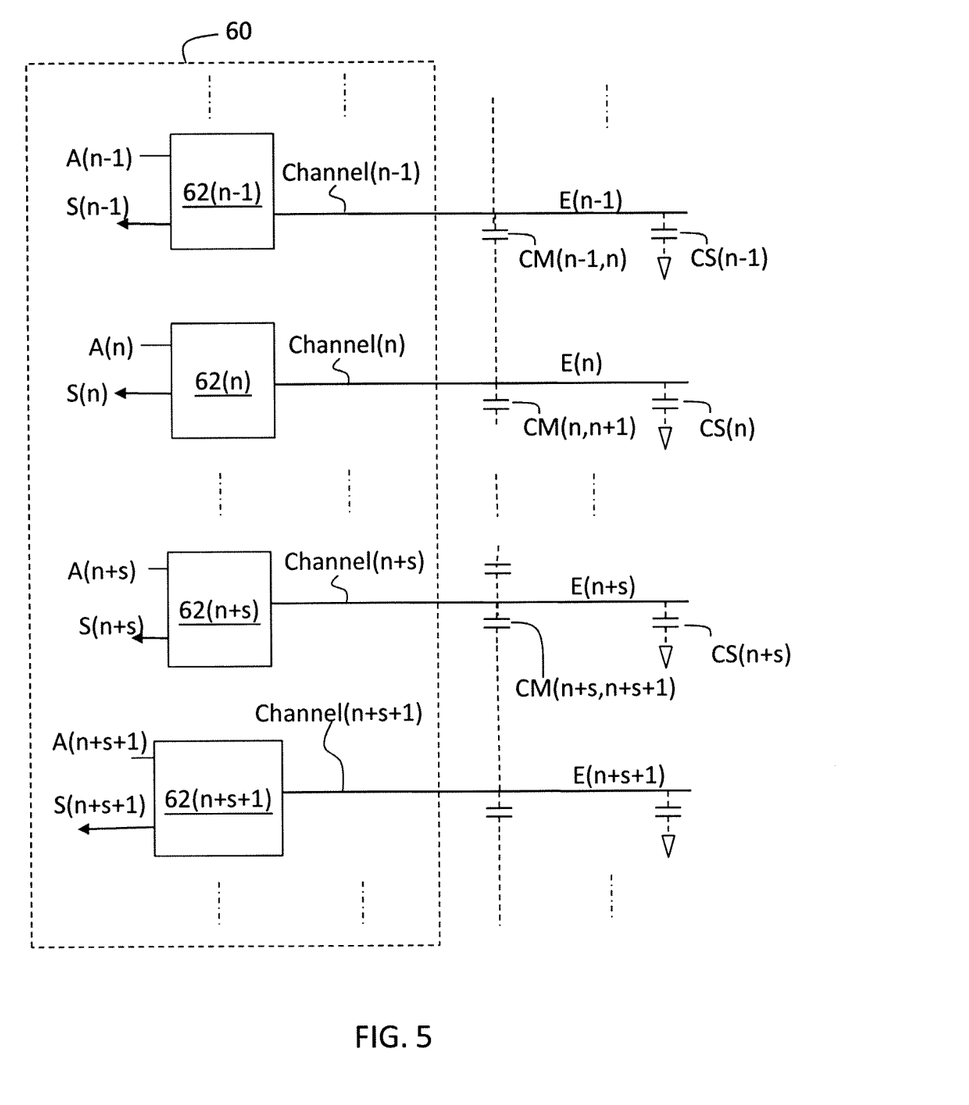
FIG. 5 is a circuit schematic diagram according to an embodiment of the present invention.
Figure 6:
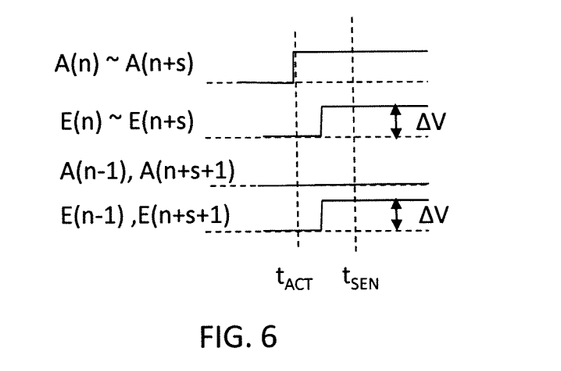
FIG. 6 shows possible waveforms of signals associated with FIG. 5.

FIG. 5 shows a schematic diagram according to an embodiment of the present invention. FIG. 6 shows possible waveforms of associated signals in FIG. 5. A sensing apparatus 60 comprises a plurality of capacitor sensors 62(0) to 62(N). For example, the sensing apparatus 60 can be the sensing apparatus 40 or the sensing apparatus 42 in FIG. 2. In the descriptions below, 62(n) represents an nth capacitance sensor, Channel(n) represents a sensor channel corresponding to the capacitance sensor 62(n), the capacitance sensor 62(n) outputs a voltage signal E(n) represented in voltage via the sensor channel Channel(n), A(n) represents an active signal received by the capacitance sensor 62(n), and S(n) represents a self capacitance signal sensed by the sensor 62(n); CS(n) represents the self capacitors connected to electrodes of the sensor channel Channel(n), and CM(n, n+1) represents the mutual capacitor between the sensor channel (n) and the sensor channel (n+1). Except for the sensor channels at two sides of the touch panel (e.g., Channel(0)), the sensor channel Channel(n) has at least two neighboring sensor channels Channel(n+1) and Channel(n−1).

FIG. 6 shows a process of the capacitance sensors 62(n) to 62(n+s) being activated to sense the self capacitance of the sensor channels Channel(n) to Channel(n+s) for touch sensing. The active signals A(n) to A(n+s) are enabled at a time point $t_{ACT}$, so that the voltage signals E(n) to E(n+s) are simultaneously increased by a voltage difference ΔV after a delay period to become step signals. As shown in FIG. 6, the voltage signals E(n−1) and E(n+s+1) (also step signals) corresponding to the neighboring sensor channels Channel (n−1) and Channel(n+s+1), not used for touch sensing, are also increased by the voltage difference ΔV at the same time. Accordingly, from the time point $t_{ACT}$ to the sensing time point $t_{SEN}$, a discharging/charging amount of the sensor channels Channel(n) to Channel(n+s) are irrelevant to the mutual capacitors CM(n−1, n) to CM(n+s, n+s+1) but are only associated with the self capacitors CS(n) to CS(n+s). That is to say, the self capacitance signals S(n) to S(n+s) read by a system then have a linear relationship with the changes in the self capacitors CS(n) to CS(n+s).

An embodiment of touch sensing is to be described in detail below. The self capacitance signal S(n) may be regarded as a sensing result of the capacitance of the self capacitor CS(n). When the capacitance signal S(n) indicates that the capacitance of the corresponding self capacitor CS(n) exceeds a first predetermined value, it is determined that a touch event takes place on the sensor channel Channel (n). In contrast, when the capacitance signal S(n) indicates that the capacitance of the corresponding self capacitor CS(n) is lower than a second predetermined value (e.g., a value same as or different from the first predetermined value), it is determined that no touch event take place on the sensor channel Channel(n). Supposing all the capacitance signals S(0) to S(N) are lower than the second predetermined value, it is determined that no touch event take place on the touch panel at all. Supposing a it is determined that a touch event takes place at successive M+1 sensor channels Channel(n) to Channel(n+M), it can be identified that a center of a touched point is approximately located on the sensor channel Channel(n+M/2) in an embodiment. In other embodiments, the center of the touched point may be identified by other approaches. For example, a derivation approach adopting center of mass may be utilized for identifying the center of the touched point. That is, different weightings are given to capacitance signals S(n) to S(n+M) corresponding to the successive M+1 sensor channels Channel(n) to Channel(n+M) that are determined with the occurrence of a touch event to obtain the center of the touched point.

For example, the voltage difference ΔV is a positive value in an embodiment and a negative value in another embodiment.

In an embodiment, when sensing the sensor channels Channel(n) to Channel(n+s), all the voltage signals E(1) to E(N) corresponding to the sensor channels Channel(1) to Channel(N) on a panel are all step signals, which are all increased by the voltage difference ΔV at about the same time.

As described above, the self capacitance signals S(n) to S(n+s) for touch sensing are independent from the changes in the mutual capacitors CM(n−1, n) to CM(n+s, n+s+1) due to a touch, and thus substantially reflect whether a touch event takes place. For other sensor channels, that is, the neighboring sensor channels except for the sensed sensor channels Channel(n) to Channel(n+s), the purpose of receiving the voltage signals is to eliminate the effects of the mutual capacitance on the sensed sensor channel rather than to adopt the voltage signals for touch sensing. In an embodiment, self capacitances of the neighboring sensor channels are not detected so that no self capacitance detection value is generated at all. In another embodiment, the self capacitance signals generated by the self capacitors of the neighboring sensor channels are sensed but are not utilized for determining whether a touch event takes place. It is to be noted that, at different time points, a previous sensed sensor channel may become a neighboring sensor channel depending on which sensor channels are to be scanned and read for touch sensing at that particular moment.

Figure 7:
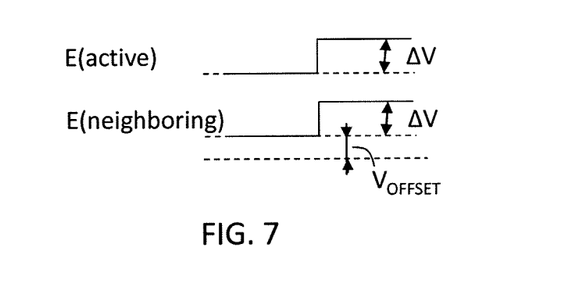
FIG. 7 shows possible waveforms of voltage signals E(active) and E(neighboring).

The voltage signals sent to the sensed electrodes from the sensed sensor channel are not necessarily identical to the voltage signals sent to the neighboring sensor channels. FIG. 7 shows signal waveforms of a voltage signal E(active) sent to a sensed sensor channel and a voltage signal E(neighboring) sent to a neighboring sensor channel. Although both of the voltage signals E(active) and E(neighboring) comprise a step voltage height ΔV, the voltage signal E(neighboring) further comprises an offset voltage $V_{OFFSET}$ compared to the voltage signal E(active). In an embodiment, the voltage signal E(neighboring) and the voltage signal E(active) are both cyclic signals, e.g., clock square waves or sine waves, and have a same frequency and a same voltage amplitude as well as a same phase. In another embodiment, the voltage signals E(neighboring) and E(active) are non-cyclic signals.

In order to eliminate or reduce an effect that the self capacitance imposes on the mutual capacitance, it is in principle that the voltage difference ΔV be maintained at a substantially same value before the charging/discharging and during the sensing after the charging/discharging but not necessarily during the charging/discharging. This implies that a cross voltage of the parasitic mutual capacitance between a sensed sensor channel and a neighboring sensor channel stays unchanged before and after the charging/discharging. Therefore, the charge stored in the mutual capacitors is also unchanged. As a result, the voltage signal E(active) only charges/discharges the self capacitors so that the charging/discharging electric charge correspondingly sensed can be linearly reflected to the capacitance change in the self capacitors.

Referring to FIG. 6, the time point $t_{ACT}$ may be regarded as before the charging/discharging, and the time point $t_{SEN}$ may be regarded as after the charging/discharging. Since the voltage signals E(n−1) to E(n+s+1) are in general maintained at a same voltage level, the voltage differences between the sensed sensor channel and the neighboring sensor channel for both before and after the charging/discharging are zeros. Referring to FIG. 7, the voltage differences between the voltage signal E(active) and the voltage signal E(neighboring) before and after the charging/discharging are both approximately the offset voltage $V_{OFFSET}$. It is to be noted that, the voltage signal E(neighboring) is not limited to be sent to a left and a right neighboring channels of sensed sensor channels. A essence of the present invention is that, a voltage signal E(active) and a voltage signal E(neighboring) with a same voltage difference dV between them at both after and before charging/discharging are respectively sent to sensed sensor channels and at least a left and a right neighboring sensor channels of the sensed sensor channels, so as to eliminate an effect that parasitic mutual capacitances between the sensed sensor channels and the neighboring sensor channels impose on capacitances of self capacitors of the sensed sensor channels. In practice, a system may also simultaneously send the voltage signal E(neighboring) to a plurality of neighboring sensor channels or even to an entire touch panel.

Figure 8:
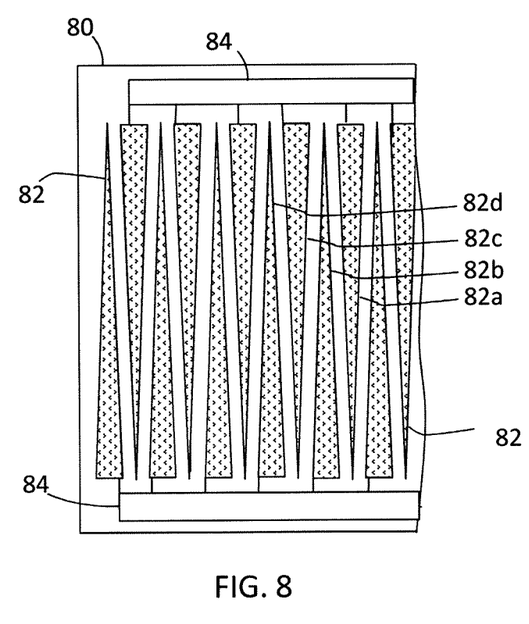
FIG. 8 is schematic diagram another touch panel applicable to the present invention.

The present invention is applicable to sensing self capacitances of any number of sensor channels. Hence, the present invention is not limited to being applied to the touch panel in FIG. 2. For example, the present invention is also applicable to a touch panel 80 in FIG. 8. The touch panel 80 comprises alternately arranged triangular or trapezoidal electrodes 82, each of which is regarded as a sensor channel connected to a sensing apparatus 84 located above or below. Based on a feature that different self capacitances are generated when a single electrode of the touch panel is touched on different sections by a finger, this type of touch panel adopting non-rectangular electrodes (sensor channels) is capable of calculating a position touched by a finger by utilizing a single-layer sensor array. In an embodiment, when the sensing apparatus 84 is to sense self capacitances of sensed electrodes 82*b* and 82*c*, the sensing apparatus 84 charges/discharges the triangular electrodes 82*b* and 82*c* with the voltage signal E(active) in FIG. 7, reads a required electric charge, and outputs a corresponding self capacitance signal for touch sensing. During the charging/discharging of the triangular electrodes 82*b* and 82*c*, the sensing apparatus 84 also charges/discharges neighboring electrodes 82*a* and 82*d* with the voltage signal E(neighboring), which is not for touch sensing. That is to say, required electric charges for generating the voltage signal E(neighboring) are not sensed, corresponding self capacitance signals are not generated, or the corresponding self capacitance signals generated are not utilized for determining whether a touch event takes place.

In an embodiment of the present invention, a sensing resulted of a self capacitance is independent from a mutual capacitance between a sensed sensor channel and a neighboring sensor channel, so that the sensing resulted of the self capacitance present a linear relationship with a change in the self capacitance, thereby maximizing accuracies of identification of a contact point and positioning of a contact point center.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for capacitance sensing, applied to a single-layer self-capacitance type touch panel comprising a plurality of triangle or trapezoidal electrodes that undergo a charging/discharging operation, the method comprising:
    outputting a first voltage signal to a first triangle or trapezoidal electrode for self-capacitance touch sensing while outputting a second voltage signal to a second triangle or trapezoidal electrode next to the first triangle or trapezoidal electrode, the second voltage signal being applied not for self-capacitance touch sensing, wherein the first and second voltage signals are different, and when the first voltage signal and the second voltage signal are respectively outputted to the first triangle or trapezoidal electrode and the second triangle or trapezoidal electrode a first voltage difference is present between the first and second triangle or trapezoidal electrodes, and
    a second voltage difference is present between the first and second triangle or trapezoidal electrodes when capacitances of the first triangle or trapezoidal electrode are sensed with no touch event sensing occurring with respect to the second triangle or trapezoidal electrode; and the first voltage difference and the second voltage difference are substantially the same,
    wherein the first voltage difference is present before the charging/discharging operation and the second voltage difference is present after the charging/discharging operation, and
    wherein the touch panel comprises a plurality of triangle or trapezoidal electrodes, and touches of different sections of each electrode generate different self capacitances.

2. The control method according to claim 1, wherein occurrence of a touch event upon the first triangle or trapezoidal electrode is determined when at least one of the sensed capacitances is greater than a predetermined value.

3. The control method according to claim 1, wherein no occurrence of touch event upon the first triangle or trapezoidal electrode is determined when none of the sensed capacitances is greater than a predetermined value.

4. The control method according to claim 1, wherein the first and second voltage signals are step signals having an approximately same voltage step height.

5. The control method according to claim 1, wherein the first and second voltage signals are cyclic signals and have an approximately same phase.

6. A capacitance sensing apparatus, applied to a single-layer self-capacitance type touch panel, the self-capacitance type touch panel comprising a plurality of triangle or trapezoidal electrodes comprising a first triangle or trapezoidal electrode and a second triangle or trapezoidal electrode, the capacitance sensing apparatus comprising:
    a plurality of capacitance sensors, respectively coupled to the triangle or trapezoidal electrodes comprising a first capacitance sensor and a second capacitance sensor that undergo a charging/discharging operation;
    wherein, while the first capacitance sensor outputs a first voltage signal to the first triangle or trapezoidal electrode for self-capacitance touch sensing,
    the second capacitance sensor outputs a second voltage signal to the second triangle or trapezoidal electrode next to the first sensor channel, the second voltage signal being applied not for self-capacitance touch sensing;
    wherein the first and second voltage signals are different,
    wherein when the first voltage signal and the second voltage signal are respectively outputted to the first triangle or trapezoidal electrode and the second triangle or trapezoidal electrode a first voltage difference is present between the first and second triangle or trapezoidal electrodes, and
    a second voltage difference is present between the first and second triangle or trapezoidal electrodes when capacitances of the first triangle or trapezoidal electrode are sensed with no touch event sensing occurring with respect to the second triangle or trapezoidal electrode,
    wherein the first voltage difference and the second voltage difference are substantially the same, and
    wherein the first voltage difference is present before the charging/discharging operation and the second voltage difference is present after the charging/discharging operation.

7. The capacitance sensing apparatus according to 6, wherein when at least one of the sensed capacitances in the first triangle or trapezoidal electrode is greater than a predetermined value, it is determined that a touch event occurs upon the first triangle or trapezoidal electrode.

8. The capacitance sensing apparatus according to 6, wherein if none of the sensed capacitances in the first triangle or trapezoidal electrode is greater than a predetermined value, it is determined that no touch event occurs upon the first triangle or trapezoidal electrode.

9. The capacitance sensing apparatus according to 6, wherein the first and second voltage signals are step signals having an approximately same voltage step height.

10. The capacitance sensing apparatus according to 6, wherein the first and second voltage signals are cyclic signals and have an approximately same phase.

* * * * *